United States Patent [19]

Harris

[11] Patent Number: 4,577,884

[45] Date of Patent: Mar. 25, 1986

[54] TRAILER HITCH

[76] Inventor: Joe L. Harris, Rte. 2, Box 2812, Porter, Tex. 77365

[21] Appl. No.: 605,461

[22] Filed: Apr. 30, 1984

[51] Int. Cl.$^4$ .......................... B60D 1/12; B60D 1/06
[52] U.S. Cl. ...................................... 280/507; 70/237
[58] Field of Search ............... 280/507, 511, 512, 513; 70/258, 237

[56] References Cited

U.S. PATENT DOCUMENTS

| | | | |
|---|---|---|---|
| 3,759,548 | 9/1973 | Kothmann | 280/511 |
| 3,876,242 | 4/1975 | Eaton | 280/511 X |
| 4,032,171 | 6/1977 | Allen | 280/507 |

Primary Examiner—John A. Pekar

[57] ABSTRACT

A device for preventing unauthorized intentional uncoupling or accidental uncoupling of a trailer from a towing vehicle. The threaded shaft of the ball slides through an upper housing allowing the upper housing to contain the shoulder of the ball so that the ball and upper housing can be mounted to a tow bar by inserting the threaded shaft of the tow ball through the aperture in a tow bar and then screwing a flanged nut onto the threaded shaft. A lower housing is then placed around the flanged nut and bolted to the upper housing so that the tow bar and the flanged portion of the flanged nut are sandwiched between the upper and lower housings. There is a yoke which encircles the shank of the tow ball, the dimensions of which make it impossible for it to slide over the ball. There is a locking hat which is placed over the trailer tongue ball socket having legs extending vertically downward allowing it to be locked to the yoke. Once in locked position, the trailer hitch cannot be disengaged without first unlocking and removing the locking hat. The locking hat and yoke do not limit the inherent rotation of the socket about the ball.

8 Claims, 5 Drawing Figures

TRAILER HITCH

BACKGROUND OF THE INVENTION

1. Field of the Invention

The present invention relates to safety trailer hitches of the type normally used to tow trailers such as those carrying boats, utility trailers and camping trailers of various types.

2. Description of the Prior Art

The prior art apparatus normally found uses various safety chains between the trailing and towing vehicles to maintain the alignment of the trailing vehicle with the towing vehicle should the socket become disengaged from the ball. Commonly a substantial amount of slack is necessary in the chain so as to allow a normal swiveling action of the trailer. This slack may create problems and inherent risk should the hitch break or in some other way become disconnected, thereby leaving the chain as the only connection between the trailer and the vehicle. Ultimately, this results in a rhythmic swing from side to side that culminates in a whipping action causing loss of control of towing vehicle.

The prior art also purports to teach the use of a yoke which is mounted on a towing vehicle and is arranged to swing to a position overlying the coupling and ball (U.S. Pat. No. 3,759,548). Among other differences, this particular device has no anti-theft feature to it. Also, the design of the housing supporting the yoke in this particular patent would restrict the angle at which the socket can rotate vertically around the ball and thereby creates an unsafe situation where the trailer tongue could bind against the yoke causing potentially large vertical forces to be applied to the tow bar and trailer tongue and possibly shear off the ball socket tightening knob. U.S. Pat. No. 4,032,171 apparently contains this identical flaw where the housing may bind against the trailer tongue in situations where the socket rotates vertically about the ball when the vehicle is turned sharply. In this particular patent, the tongue will bind against the housing creating a further unsafe situation when the towing vehicle is turned to a severe angle in relation to the trailer this binding occuring at substantially less than a ninety degree (90°) angle. U.S. Pat. No. 3,605,457 appears to teach a device which can be installed on a trailer tongue ball socket which would prevent unauthorized persons from inserting their own balls into the ball socket and driving off with an unattended trailer. It cannot be used to tow a trailer and it requires a dummy tow ball.

SUMMARY OF THE INVENTION

The present invention includes a tow ball having a shank extending down to a shoulder which in turn has a threaded shaft extending from it. The shoulder is tapered, having its widest diameter nearest the ball and its smallest diameter furthest from the ball. There is a guide post which extends from the base of the shoulder parallel to the threaded shaft. There is an upper housing through which the threaded shaft is inserted and into which the shoulder is snugly fitted. The cavity in the upper housing which receives the shoulder is tapered to match the taper of the shoulder. There is an orifice at the base of the cavity into which the guide post inserts thereby preventing the tow ball from rotating within the upper housing. Before the threaded shaft and shoulder are inserted in the upper housing, they are inserted through a bore in a yoke means. The diameter of the bore in the yoke means is larger than the diameter of the shoulder but smaller than a diameter of the ball so that the yoke means cannot be pulled off over the ball. The yoke means has two hinged ends with a bracket ear extending from each hinge. The threaded shaft is inserted through a hole in the tow bar of the towing vehicle so that the base of the upper housing rests on the top of the tow bar. A flanged nut is then screwed onto the threaded shaft that extends below the tow bar pulling the shoulder as far as possible within the upper housing. There are two countersunk bores in the upper housing through which bolts can be inserted downwardly, one on each side of the threaded shaft. The lower housing is then placed around the flanged nut from beneath so that the nut portion of the flanged nut is encircled by the lower housing while the flange portion of the flanged nut has a diameter greater than the diameter of the bore of the lower housing receiving the flanged nut and therefore, the flange portion is sandwiched between the lower housing and the bottom of the tow bar. The two bolts which were inserted through the upper housing are then screwed into threaded bores in the lower housing. The bolts are locking bolts meaning that once they are screwed in place they cannot be unscrewed. Thus assembled, the tow ball is ready to receive the trailer tongue. With the tongue in place, the locking hat is inserted over and about the trailer tongue directly over the ball. The locking hat is U-shaped and is placed over the tongue so that the sides of the U extend vertically downward. From each side of the locking hat there protrudes a locking post which extends outwardly from the U-shape. The locking hat may be welded in position about the trailer tongue in which case it need be positioned so that the cylindrical axes of the locking posts project horizontally through the approximate center of the ball when it is inserted in the socket. Each locking post is cylindrical having a tapered end forming the shape of a truncated cone. The hinged bracket ears of the yoke are then pivoted upward so that the locking posts are inserted through apertures in the bracket ears. The locking bar of a padlock is inserted through an orifice in each locking post thereby locking the locking hat in place. In this proper position, the locking hat may be welded to the top of the trailer tongue.

Thus configured the locking hat will not limit vertical rotation of the socket about the ball to less than the inherent limits of the ball itself. Similarly, the locking hat and yoke means will not restrict horizontal rotation of the socket about the ball. In other words, the device will not create potentially unsafe situations where it will bind against a trailer tongue.

Disassembly of the tow ball once in place is not possible. The bolts cannot be unscrewed and therefore, the lower housing cannot be removed which, in turn, means that the flanged nut cannot be removed. The guide post prevents the ball from being unscrewed from above.

A primary object of the invention is to provide a safety trailer hitch for maintaining the safe coupling of a trailer with its towing vehicle.

A further object of the invention is to provide a safety trailer hitch for preventing accidental uncoupling of the trailer.

Another object of the invention is to provide a trailer hitch for preventing the intentional uncoupling of a trailer by unauthorized persons.

Yet another advantage and feature of the invention resides in a yoke means and locking hat means which will not restrict normal rotation of the ball socket about the ball.

A further feature of the invention is that the ball, once installed on a towing vehicle, may not be removed thereby preventing unauthorized removal of the ball itself.

A further feature and advantage of the invention resides in a hinged safety yoke means which allows easy installation and removal of the locking hat thereby allowing easy engagement and disengagement of the trailer.

Yet another feature of the invention resides in a padlocking structure designed to eliminate the possibility of unlawful removal of the trailer.

Still another feature of the invention is that the locking hat may be permanently attached to the trailer tongue ball socket allowing it to be used in conjunction with an auxiliary yoke which prevents unauthorized persons from engaging the ball socket to their own ball driving off with an unattended trailer.

DETAILED DESCRIPTION OF THE DRAWINGS

DESCRIPTION OF THE PREFERRED EMBODIMENT

Figure 1:
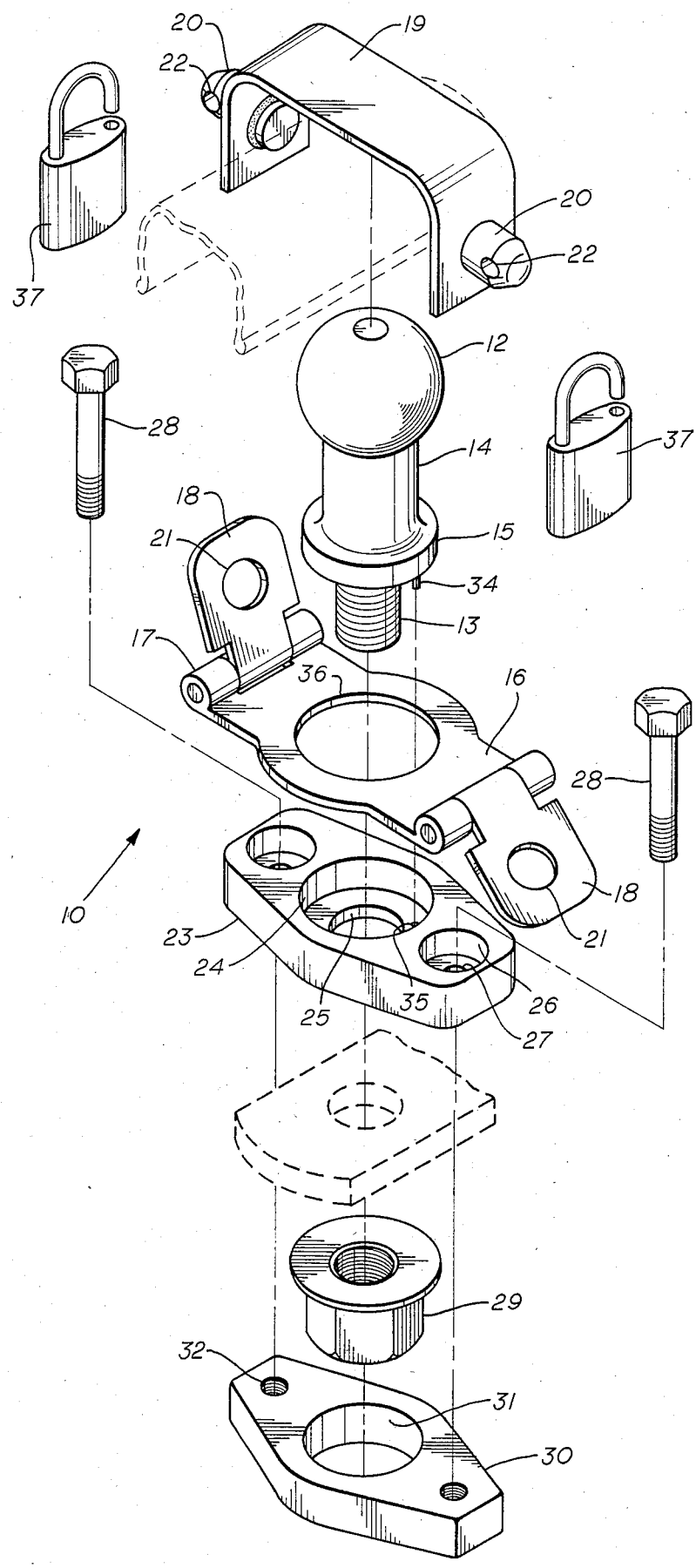
FIG. 1 is an isometric view of the improved trailer hitch showing the principal parts thereof in exploded position.

With reference now to the drawings wherein like numerals denote like parts in the views, the reference numeral 10 indicates generally a safety trailer hitch constructed in accordance with the invention.

The safety trailer hitch 10 is designed to bolt through a typical tow bar of the towing vehicle, a portion of the tow bar shown in FIG. 1 in ghost. The safety trailer hitch 10 includes a ball 12 having a cylindrical shank 14 extending from the ball to a radially extended shoulder 15 which extends outwardly from the shank 14 of the ball 12. There is a threaded shaft 13 extending from the base of the shoulder 15 whose cylindrical axis is substantially colinear with the cylindrical axis of the shank 14. The ball 12, shank 14, shoulder 15 and threaded shaft 13 are machined from one piece of bar stock so as to form a continuous, non-jointed structure. The shoulder 15 is slightly tapered so that the diameter of the shoulder at a point nearest the ball 12 is larger than the diameter of the shoulder 15 at a point furthest from the ball 12. There is a guide post 34 extending vertically downward from the base of the shoulder 15 with its cylindrical axis substantially parallel to the cylindrical axis of the threaded shaft 13.

There is a yoke 16 which has two hinged ends. The yoke 16 is substantially flat and has a bore 36 through the center of it which has a diameter greater than the diameter of the shoulder 15 but less than the diameter of the ball 12 so that the shoulder 15 and the shank 14 may pass through the bore of the yoke 16 but the ball 12 may not.

From each hinge 17 of the yoke 16 there extends a bracket ear 18 which pivots about the hinge 17. There is a locking hat 19 which is substantially U-shaped so that it will fit over and around the ball socket of the trailer tongue shown in ghost allowing the sides of the locking hat 19 extend vertically downward. There is a locking post 20 protruding horizontally and outwardly from each side of the locking hat 19. The locking post 20 is cylindrical having a truncated conical end. The bracket ears 18, pivotally connected to the yoke 16 by hinges 17 have apertures 21 through which the locking post 20 can be placed. There is an orifice 22 through each locking post 20. The locking bar of a padlock 23 or similar locking means may be inserted through the orifice 22 when it is desired to lock the locking hat 19 to the yoke 16. The locking hat 19 may be welded to the ball socket of the tow bar, thereby permanently mounting it to the trailer tongue. If the locking hat 19 is welded to the trailer tongue, it should be welded to the top of the tow bar so that the cylindrical axes of the locking posts 20 extends substantially through the center of the ball 12.

There is an upper housing 23 which is machined from plate stock and which is substantially an oblate ellipse in shape. In the center of the oblate elliptical face of the upper housing 23, there is a cylindrical cavity whose vertical axis is substantially perpendicular to the oblate elliptical face. This cylindrical cavity 24 extends into but not through the housing. The cylindrical cavity 24 is tapered so as to snugly fit against the shoulder 15 when the shoulder 15 is inserted therein. There is a bore 25 through the upper housing 23 whose axis is colinear with the axis of the cylindrical cavity 24. The bore 25 extends through the upper housing 23. The diameter of the bore 25 is less than the diameter of the cylindrical cavity 24 but greater than the diameter of the threaded shaft 13 so that the threaded shaft 13 may be inserted through the bore 25 allowing the shoulder 15 to snugly fit into the cylindrical cavity 24 of the upper housing 23. There is an orifice 35 in the ledge created by the combination of the cylindrical cavity 24 and the bore 25 in the upper housing 23. The guide post 34 inserts into the orifice 35 thereby preventing the ball 12 any rotational movement relative to the upper housing 23.

There are two smaller cylindrical cavities 26 located on opposite sides of the cylindrical cavity 24 in the upper housing 23. The axes of these cylindrical cavities 26 are parallel to the axes of the cylindrical cavity 24. There is a bore 27 through each end of the upper housing 23 with the axis of these bores 27 colinear with the axes of the cylindrical cavities 26 so that the bores 27 extend completely through the upper housing 23. A locking bolt 28 is inserted through each bore 27 so that the head of the bolt 28 sits within the cylindrical cavity 26 with the shaft of the bolt 28 extending through the bore 27 thereby providing a countersink arrangement. There is a flanged nut 29 which threads onto the threaded shaft 13. There is a lower housing 30 which is also machined from plate stock and is also substantially an oblate ellipse.

There is a bore 31 extending through the lower housing 30 the diameter of which is large enough that the nut portion of the flanged nut 25 can be inserted therein but small enough that the flange portion of the flanged nut 29 will not pass therethrough. There is a threaded orifice 32 located at each end of the lower housing 30. The axis of these threaded orifices 32 are substantially parallel to the axis of the bore 31 and the shank 14. The bolts 28 thread into the threaded orifices 32. Once screwed in place, the bolts 28 cannot be unscrewed because of their locking thread design.

To assemble the safety trailer hitch 10 it is first necessary to insert the bolts 28 through the bores 27. The threaded shaft 13 is then inserted through the central bore of the yoke 16 and bore 25 of the upper housing 23 so that guide post 34 enters orifice 35. With the shoulder 15 snugly fitting within the cylindrical cavity 24 of the upper housing 23, the threaded shaft 13 is inserted through the bore of tow vehicle tow bar from above. Flanged nut 29 is then screwed tightly onto to the threaded shaft 13 so that the flange portion of the flanged nut 25 is firmly against the lower face of the tow vehicle tongue. The lower housing 30 is then placed over the flanged nut 29 and the bolts 28 are screwed into the threaded orifices 32. The ball socket of the tow bar is then placed over and about the ball 12. If the locking hat 19 has not been welded to the tow bar, it must now be placed over the tow bar just above the ball socket.

The bracket ears 18 are then rotated upward so that the locking post 20 of the locking hat 19 insert through the apertures 21 of the bracket ears 18. Locking bars of the padlocks 37 are then inserted through the orifices 22 of the locking posts 20 thereby locking the locking hat 19 into place.

Once assembled and installed in this manner, the ball socket may not be removed from the ball 12 without first unlocking and removing the locking hat 19. Thus, the locking hat 19 serves as a safety device which prevents the trailer from uncoupling should the ball 12 partially disengage from the ball socket. Since padlocks 37 serve to couple the locking hat to the yoke 16, the preferred embodiment also serves as an anti-theft device. Because the bolts 28 cannot be unscrewed, it is also not possible to remove the lower housing 30. Therefore, the flanged nut 25 cannot be accidentally or intentionally unthreaded from the threaded shaft 13. This prevention of unauthorized uncoupling of the trailer from the tow vehicle yields the safety and anti-theft features of the invention.

Figure 4:
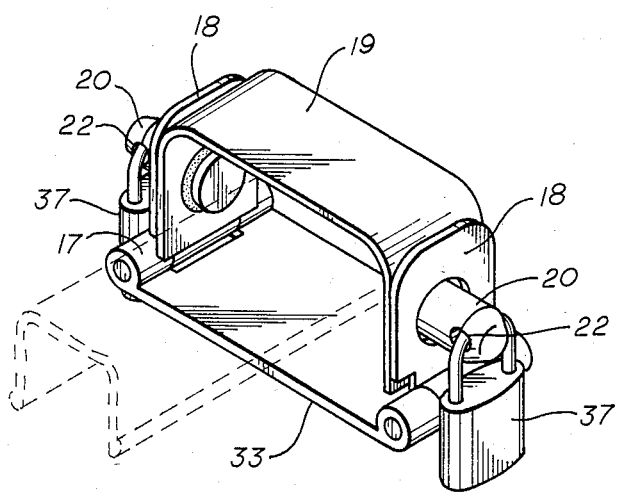
FIG. 4 is an isometric view of an anti-theft auxiliary yoke which can be locked in place when the trailer is not connected to a towing vehicle.

In FIG. 4, there is shown an auxiliary yoke 33 which is identical to the yoke 16 but has no central bore. The auxiliary yoke 33 is only useful if the locking hat 19 is welded to the top of the ball socket of the tow bar. If such is the case, the auxiliary yoke 33 may be locked to the locking hat 19 when the tow vehicle and the trailer are uncoupled. This prevents the insertion of another tow ball into the ball socket without first removing the auxiliary yoke 33. As such, the auxiliary yoke 33 serves as an additional antitheft feature in that unauthorized persons could not tow away the trailer by merely inserting the tow ball of their own tow vehicle into the ball socket of the trailer tongue.

Figure 5:
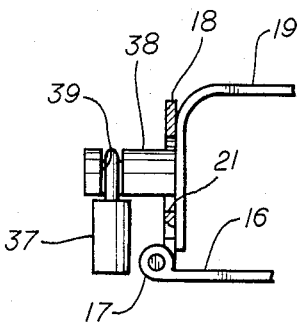
FIG. 5 is a cross-sectional view of an alternative embodiment locking post.
Figure 2:
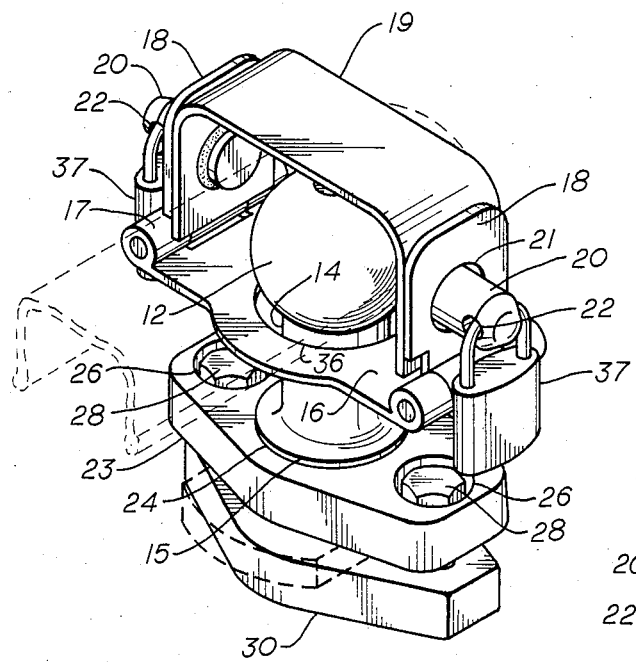
FIG. 2 is an isometic view of the improved trailer hitch showing the parts thereof in operational position.
Figure 3:
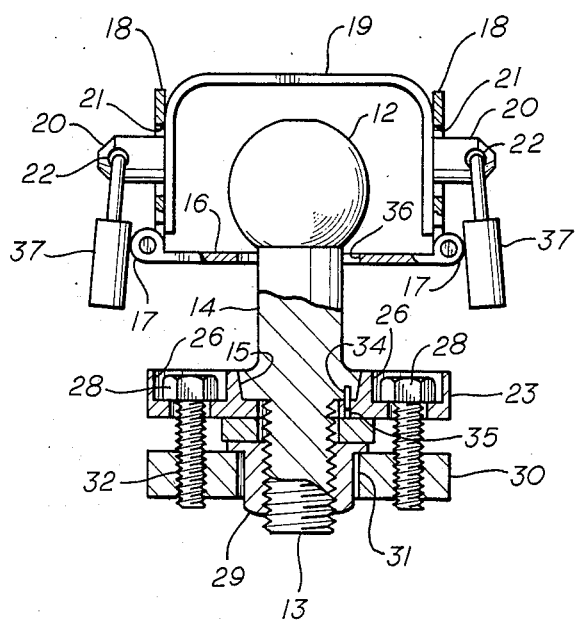
FIG. 3 is a cross-sectional view of the improved trailer hitch showing the parts thereof in operational position.

In FIG. 5, there is shown an alternate embodiment locking post 38 which protrudes from an otherwise identical locking hat 19. The locking posts 19 are cylindrical, each having a circumferential groove 39 located near the distal end. The locking bars of padlocks 37 fit snugly within the groove 39 so that the padlocks 37 are in difficult position to pry or cut off.

In summary there is hereinabove described a trailer hitch locking apparatus which facilitates ready removal of the trailer by mere insertion of the proper keys into ordinary padlocks 23. Upon removal of the padlocks 23, the locking hat 19 can be uncoupled from the yoke 16 thereby allowing the trailer hitch to be easily removed. The trailer hitch is not, however, receptive to forced removal in any way. Contrary to conventional trailer hitches, with the present invention, a trailer hitch ball socket cannot be uncoupled by removing the hitched apparatus herein. Thus, the trailer hitch of the invention effectively precludes accidental loss of the trailer and intentional removal by unauthorized persons. It eliminates the need for safety chains or other such apparatus.

Having thus described the preferred embodiment of the invention, it should be understood that numerous structural modifications and adaptations of the inventive apparatus may be resorted to without departing from the spirit and scope of the following claims.

What is claimed is:

1. A safety and anti-theft locking device for use with ball and socket type couplings as may be used in the coupling of a tongue of a trailer to a towing vehicle tow bar comprising:
    a. a tow ball characterized by a ball, a shank, a shoulder, a threaded shaft and a nut therefore;
    b. a yoke means having a central bore therethrough and through which rests the shank, the diameter of said bore being large enough to loosely encircle said shank but smaller than the diameter of said ball thereby not allowing said yoke means to be removed over said ball so that said yoke means will rotate freely about said shank in conjunction with the trailer tongue;
    c. a locking hat means placed over the trailer tongue and removably affixed to said yoke means so that when said locking hat means is coupled to said yoke means the ball socket of the trailer tongue cannot become disengaged from said ball and said locking hat means will rotate about said ball in unison with the ball socket.

2. A device as recited in claim 1 wherein, said nut is characterized by a flange radially extending therefrom, said flange having two load bearing surfaces with the first of said load bearing surfaces adapted to abut the tow bar of the towing vehicle.

3. A device as recited in claim 2 further comprising:
    a. an upper housing in which said shoulder resides and through which said threaded shaft extends;
    b. a lower housing which encircles said portion of said flanged nut and sandwiches said flanged portion of said flanged nut between said lower housing and the tow bar of the towing vehicle, the lower housing abutting said second load bearing surface of said flange, so that said flanged nut may not be removed without first removing said lower housing;
    c. means for permanently attaching said lower housing to said upper housing so that said upper and lower housings may not be disassembled from one another nondestructively.

4. A device as recited in claim 1 further comprising:
    a. an upper housing in which said shoulder resides and through which said threaded shaft extends;
    b. a lower housing which completely encloses said nut under the tow bar of the towing vehicle and within a cavity of said lower housing so that said nut may not be removed without first removing said lower housing.
    c. means for permanently attaching said lower housing to said upper housing so that said upper and lower housings may not be disassembled from one another nondestructively.

5. A device as recited in claim 3 or 4 further comprising:
a. a guide post extending from the base of said shoulder parallel to said threaded shaft;
b. an orifice in said upper housing adapted to receive said guide post when said shoulder is inserted in said upper housing so that said tow ball cannot rotate within said housing thereby preventing the unscrewing of said tow ball from said nut.

6. A device as recited in claim 1 wherein, said locking hat means is welded to the trailer tongue.

7. A device as recited in claim 6 further comprising, an auxilliary yoke means having no central bore so that when said auxilliary yoke means is locked to said locking hat means on an uncoupled trailer said auxilliary yoke means will block the insertion of the tow ball of an unauthorized person.

8. The tongue of a trailer characterized by a socket on the end thereof for receiving the ball of a towing apparatus, the improvement comprising:
a. a supplemental locking means including a yoke having a bore therethrough rotatably surrounding a shank extending from the ball, the diameter of said bore being large enough to loosely encircle said shank but smaller than the diameter of the ball so that said yoke cannot be removed over the ball and thereby enabling substantially universal movement of the ball within said yoke, and;
b. a locking hat means substantially enclosing the ball and socket removably affixed to said yoke means to thereby preclude unintended separation of the ball from the socket while enabling freedom of movement of the ball within the socket.

* * * * *